US012307888B2

(12) United States Patent
Scheider et al.

(10) Patent No.: US 12,307,888 B2
(45) Date of Patent: May 20, 2025

(54) METHOD AND SERVER FOR CONTROLLING TRAFFIC LIGHTS

(71) Applicant: Kapsch TrafficCom AG, Vienna (AT)

(72) Inventors: Thomas Scheider, Baden (AT); Erich Zoechmann, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 209 days.

(21) Appl. No.: 18/348,104

(22) Filed: Jul. 6, 2023

(65) Prior Publication Data

US 2024/0021079 A1 Jan. 18, 2024

(30) Foreign Application Priority Data

Jul. 14, 2022 (EP) .................................... 22184884

(51) Int. Cl.
*G08G 1/08* (2006.01)
*G08G 1/01* (2006.01)
*G08G 1/081* (2006.01)

(52) U.S. Cl.
CPC ........... *G08G 1/081* (2013.01); *G08G 1/0145* (2013.01)

(58) Field of Classification Search
CPC ........ G08G 1/081; G08G 1/0145; G08G 1/08; G08G 1/087
See application file for complete search history.

(56) References Cited

U.S. PATENT DOCUMENTS 6,313,757 B1 11/2001 Braun
2016/0027300 A1* 1/2016 Raamot ................ G08G 1/0145 340/922
2020/0175860 A1* 6/2020 Jiang .................... G08G 1/0129
2021/0201673 A1 7/2021 Nguyen
2024/0142609 A1* 5/2024 Liller ...................... G06T 7/337

FOREIGN PATENT DOCUMENTS

CN 107016860 A 8/2017
CN 108335497 B 9/2021
WO 2016/022108 A1 2/2016

OTHER PUBLICATIONS

Extended European Search Report received for European Patent Application No. 22184884.9, mailed on Dec. 21, 2022, 5 pages.

* cited by examiner

*Primary Examiner* — Joseph H Feild
*Assistant Examiner* — Sharmin Akhter
(74) *Attorney, Agent, or Firm* — Weaver IP L.L.C.

(57) ABSTRACT

The present disclosed subject matter relates to a method of controlling event-responsive traffic lights at an intersection of lanes by a controller which switches the traffic lights in a sequence of phases. The controller has a memory storing a set of phase sequences and is configured to change from one phase sequence to another. The method comprises, in a server: a) generating candidate sets of phase sequences; b) determining the traffic flows on the lanes; c) calculating a cost measure for each candidate set; and d) sending the candidate set with the lowest cost measure to the controller; in the controller, receiving and storing the sent set in the memory as the set; and repeating steps b)-d). The disclosed subject matter further relates to the server used in said method.

14 Claims, 4 Drawing Sheets

METHOD AND SERVER FOR CONTROLLING TRAFFIC LIGHTS

CROSS-REFERENCE TO RELATED APPLICATIONS

Figure 1:
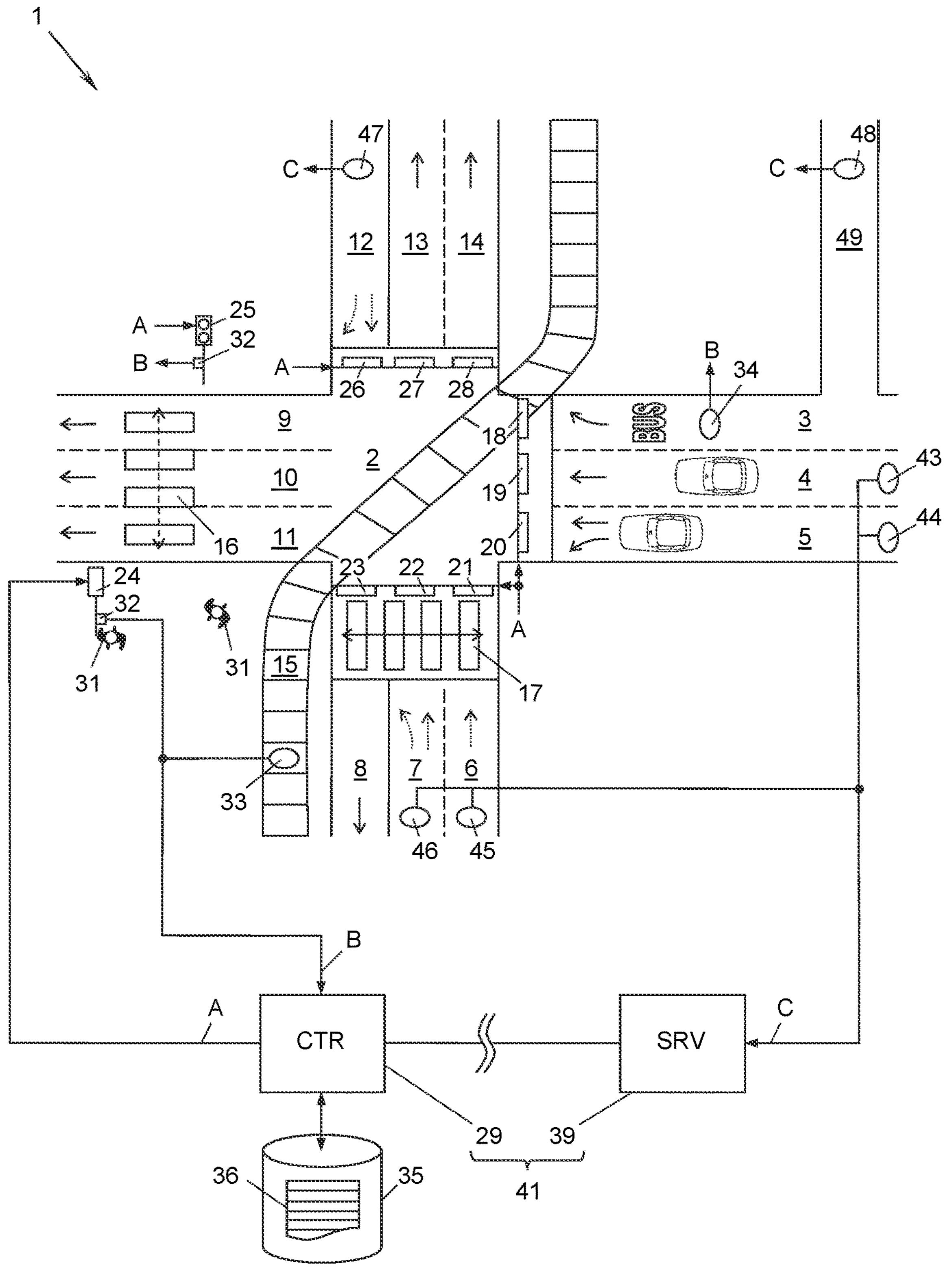

This application claims priority to European Patent Application No. 22 184 884.9 filed Jul. 14, 2022, the disclosure of which is incorporated herein by reference.

TECHNICAL FIELD

The present disclosed subject matter relates to a method of controlling event-responsive traffic lights at an intersection of lanes in a transportation network. The disclosed subject matter further relates to a server used in said method.

BACKGROUND

Event-responsive traffic lights enable a flexible traffic light control adapted to a detected lane-related event at an intersection of lanes in a transportation network. To this end, a controller which switches the traffic lights between different switching states (also called "phases") according to a specific phase sequence in cycles may detect one or more lane-related events such as the presence or arrival of pedestrians, trams, buses, emergency vehicles, etc., and change to switching the traffic lights according to a different phase sequence to take into account the traffic demand related to the event.

For instance, at an intersection of a car lane and a pedestrian crosswalk with a push-button for pedestrian detection, the controller may change—upon button pushing—from a first phase sequence comprising a single first switching state with a green traffic light for the car lane and a red traffic light for the pedestrian crosswalk to a second phase sequence comprising the first switching state and a second switching state of reversed traffic light colours to allow for pedestrian crossing in the current cycle. When the pedestrian/s have crossed the lane, the controller may change back to the first phase sequence to allow for undisturbed car traffic in a subsequent cycle and wait for a further button pushing to induce a further phase sequence change.

However, most often the phase sequences that are statically stored in and available to the controller do not satisfy the current or near-future traffic situation in the transportation network. For instance, in the above exemplary intersection of a pedestrian crosswalk crossing a car lane, the duration and the number of occurrences of the pedestrian traffic-allowing second switching state can affect the overall traffic situation in the transportation network. On the one hand, if this duration is too long or if there are too many occurrences, cars at the intersection wait unnecessarily, long car queues gradually form, slowing down traffic at neighbouring intersections, and ultimately traffic jams arise. On the other hand, if this duration is too short or if there are too few occurrences, pedestrian queues form and pedestrians tend to dangerously cross the crosswalk in a non-allowing traffic light switching state. Empirical as well as theoretical optimisations of the phase sequences that are statically stored may be performed, e.g., for average traffic flows on the lanes forming the intersection, which, however, still cannot cope with the traffic fluctuations arising over time.

Consequently, traffic lights are still controlled according to unsuitable phase sequences resulting in retarded traffic flows, long queue lengths, traffic jams and dangerous unallowed lane crossings.

BRIEF SUMMARY

It is an object of the present disclosed subject matter to provide a method and a server for controlling traffic lights which allow for an improved event-responsive traffic light control.

To this end, in a first aspect the disclosed subject matter provides for a method of controlling event-responsive traffic lights at an intersection of lanes in a transportation network by means of a controller which switches the traffic lights in cycles and, in each cycle, in a sequence of phases, each phase corresponding to a different switching state of the traffic lights and allowing traffic flow on none, one or more of the lanes, wherein the controller has a memory storing a set of phase sequences and is configured to change from one phase sequence of the set to another phase sequence of the set upon detection of a lane-related event, and by means of a central server connected to the controller and to one or more sensors that measure traffic flows on the lanes, the method comprising, in the server:

a) generating candidate sets of phase sequences, wherein in each candidate set all phase sequences have a same number of time slots in the same order, each time slot is occupied by a respective phase and time slots of the same order have the same duration, and wherein each candidate set differs in at least one duration of a time slot of a specific order;

b) determining the traffic flows on the lanes by means of the one or more sensors;

c) calculating a cost measure for each candidate set on the basis of the determined traffic flows on the one hand and the durations on the other hand; and d) sending the candidate set with the lowest cost measure to the controller;

in the controller, receiving and storing the sent set in the memory as the set of phase sequences; and repeating steps b)-d) in successive intervals.

The method of the disclosed subject matter is based on a repeated update of the set of phase sequences used by the controller for traffic light switching. The server repeatedly determines the current or near-future traffic flow on the lanes of the intersection from the traffic flows measured by the sensor/s, identifies that candidate set of phase sequences which fits the determined traffic flow and sends that candidate set to the controller which, in turn, receives, stores and uses the same until the next update. As a result, the controller always uses a set of phase sequences which currently minimises the traffic flow dependent cost measure. The set of phase sequences is thus always adapted to the current or near-future traffic flow in the transportation network, in particular in the vicinity of the intersection.

The candidate sets, from which the set of phase sequences used by the controller is repeatedly identified, are generated with a specific time-slotted structure: Each candidate set has its own grid of ordered time slots common to all phase sequences contained therein. Therefore, a change from one phase sequence to another phase sequence within a specific candidate set can be easily carried out at candidate set specific phase transition times ("anchor points") between each two time slots and, hence, all phase sequences in a candidate set are per design compatible with one another with respect to timing. This allows the controller to detect lane-related events occurring in a time slot and to change at the transition time (anchor point) to the next time slot to that phase sequence of the (currently stored) optimal set which fits to the detected events.

Summing up, the inventive methods allows for a traffic light control according to a set of phase sequences which is adapted to the current or near-future traffic flows in the transportation network such that traffic flows are accelerated, queue lengths reduced, traffic jams minimized and unallowed pedestrian lane crossings prevented.

In a favourable embodiment each of said intervals lasts at least two cycles. Thereby, the frequency of traffic flow determination will be decoupled from the controller cycles and can, e.g., be adapted to traffic flow measurement constraints. Furthermore, optimal candidate set identification and sending and, hence, communication bandwidth needs therefor will be reduced.

In one embodiment the candidate sets are generated such that, in all candidate sets, a specific phase occupies only time slots which each have a minimum duration. By selecting only time slots of at least a minimum duration for a specific phase, constraints such as the minimum traversing time for pedestrians, bikers, cars, etc. required for that phase can be implemented in a simple manner and a generation of unsuitable candidate sets can be avoided. Or, seen from another perspective, the solution space of available candidate sets to be considered by the server is reduced and the optimal candidate set can be identified faster and at a lower computational cost.

The cost measure which is employed in identifying the optimal set of phase sequences can be any suitable traffic measure considering, e.g., locations, counts, speeds, accelerations etc. of traffic participants. Favourably, the cost measure is an average waiting time or an average queue length. These quantities are particularly impactful and, thus, suited to accelerate traffic flows, reduce queue lengths, and avoid traffic jams as best as possible. When the cost measure is an average waiting time, it may be calculated as $$D_k = C \cdot \sum_{j=1}^{J} \left( \frac{1}{\sum_{i=1}^{I} q_{i,j,k}} \cdot \sum_{i=1}^{I} \frac{q_{i,j,k} \cdot (T_c - T_{g,i,j,k})^2}{\left(1 - \frac{q_{i,j,k}}{s_{i,j,k}}\right)} \right) \quad (1)$$

with $D_k$ the cost measure for the k-th candidate set, $T_{g,i,j,k}$ the duration of the i-th time slot of the j-th phase sequence of the k-th candidate set, $q_{i,j,k}$ the cumulative determined traffic flow on all lanes which allow traffic flow in the phase that occupies the i-th time slot of the j-th phase sequence of the k-th candidate set, $s_{i,j,k}$ the cumulative given saturation flow on all lanes which allow traffic flow in the phase that occupies the i-th time slot of the j-th phase sequence of the k-th candidate set, $T_c$ the cycle duration, I the number of time slots in the j-th phase sequence of the k-th candidate set, J the number of phase sequences of the k-th candidate set, and C a constant.

Such a cost measure calculation is particularly easy to implement and fast in execution such that the candidate set which minimises the cost measure can be quickly identified.

The traffic flows on the lanes may in principle be determined only from the traffic flows measured on that lanes which form the intersection of interest. Alternatively, the traffic flows on these lanes may be determined by utilising further information on the transportation network. To this end, it is beneficial when the server is connected to a further sensor for measuring a traffic flow on a further lane in the transportation network, and when, in said step b) of determining the traffic flows, the traffic flow on the further lane is as well taken into account. Thereby, the near-future traffic flow on the lanes that form the intersection can be more accurately determined and considered to identify and send the most suitable candidate set to the controller. Moreover, when the inventive method is carried out for all intersections in the transportation network, the traffic light switching in the whole transportation network may be optimised and traffic interrelations at different intersections may be taken into account more accurately the more traffic flows are measured throughout the entire transportation network.

In a second aspect the disclosed subject matter provides for a central server for controlling event-responsive traffic lights at an intersection of lanes in a transportation network, the server being connectable to a controller that switches the traffic lights in cycles and, in each cycle, in a sequence of phases, each phase corresponding to a different switching state of the traffic lights and allowing traffic flow on none, one or more of the lanes, and being connectable to one or more sensors that measure traffic flows on the lanes, wherein the server is configured to:

a) generate candidate sets of phase sequences, wherein in each candidate set all phase sequences have a same number of time slots in the same order, each time slot being occupied by a respective phase and time slots of the same order having the same duration, and wherein each candidate set differs in at least one duration of a time slot of a specific order;

b) determine the traffic flows on the lanes by means of the one or more sensors;

c) calculate a cost measure for each candidate set on the basis of the determined traffic flows on the one hand and the durations on the other hand; and d) send the candidate set with the lowest cost measure to the controller; and to repeat the steps b)-d) in successive intervals, each interval lasting at least two cycles.

As to the inventive server, the same benefits, advantages and optional features apply as were discussed for the method of the disclosed subject matter.

BRIEF DESCRIPTION OF THE DRAWINGS/FIGURES

Figure 2:
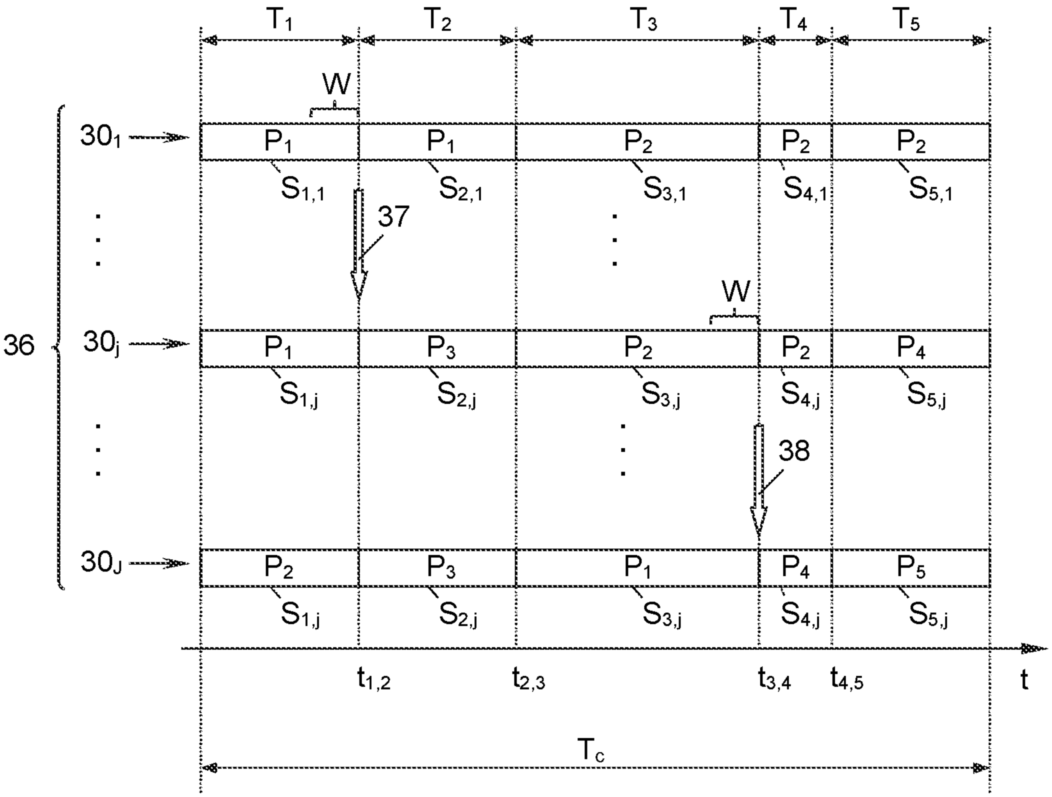
Figure 3:
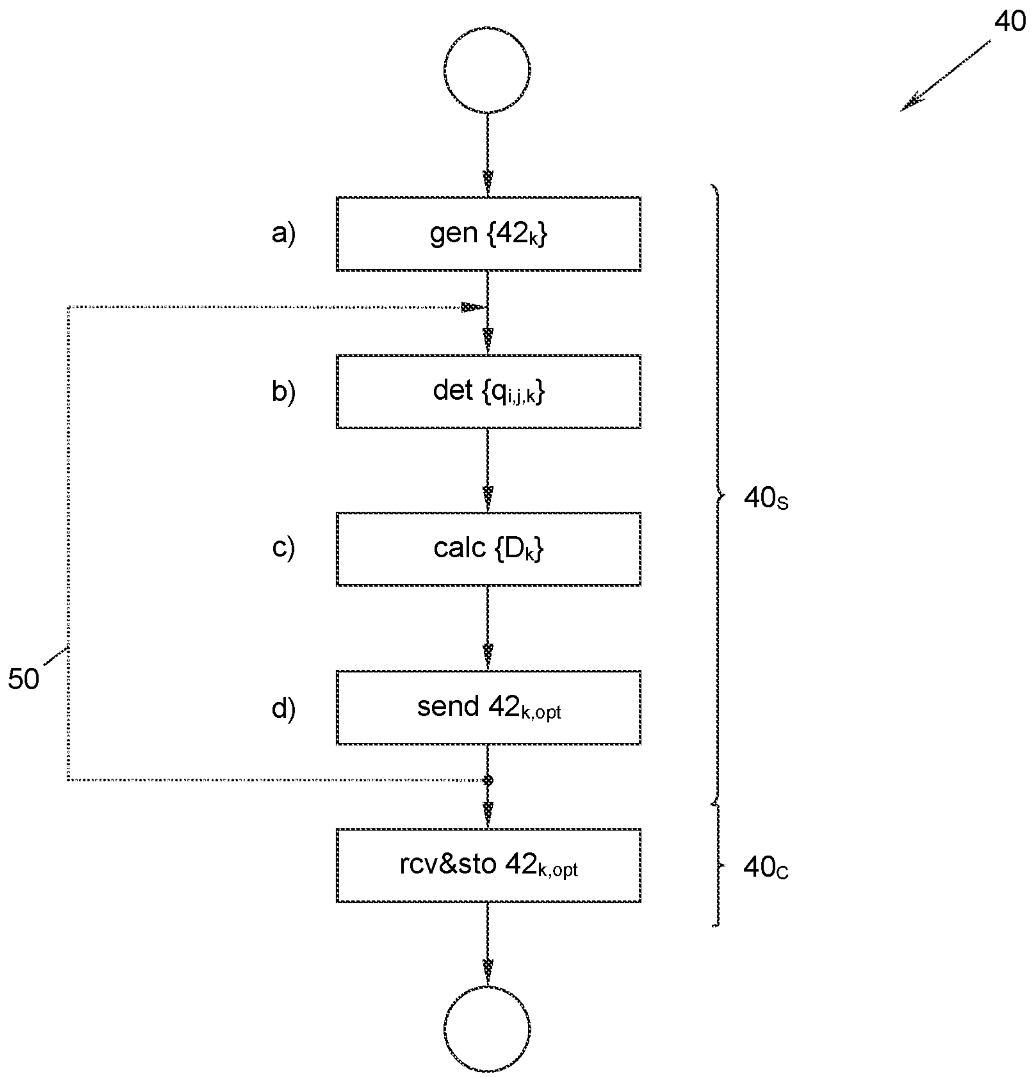
Figure 4:
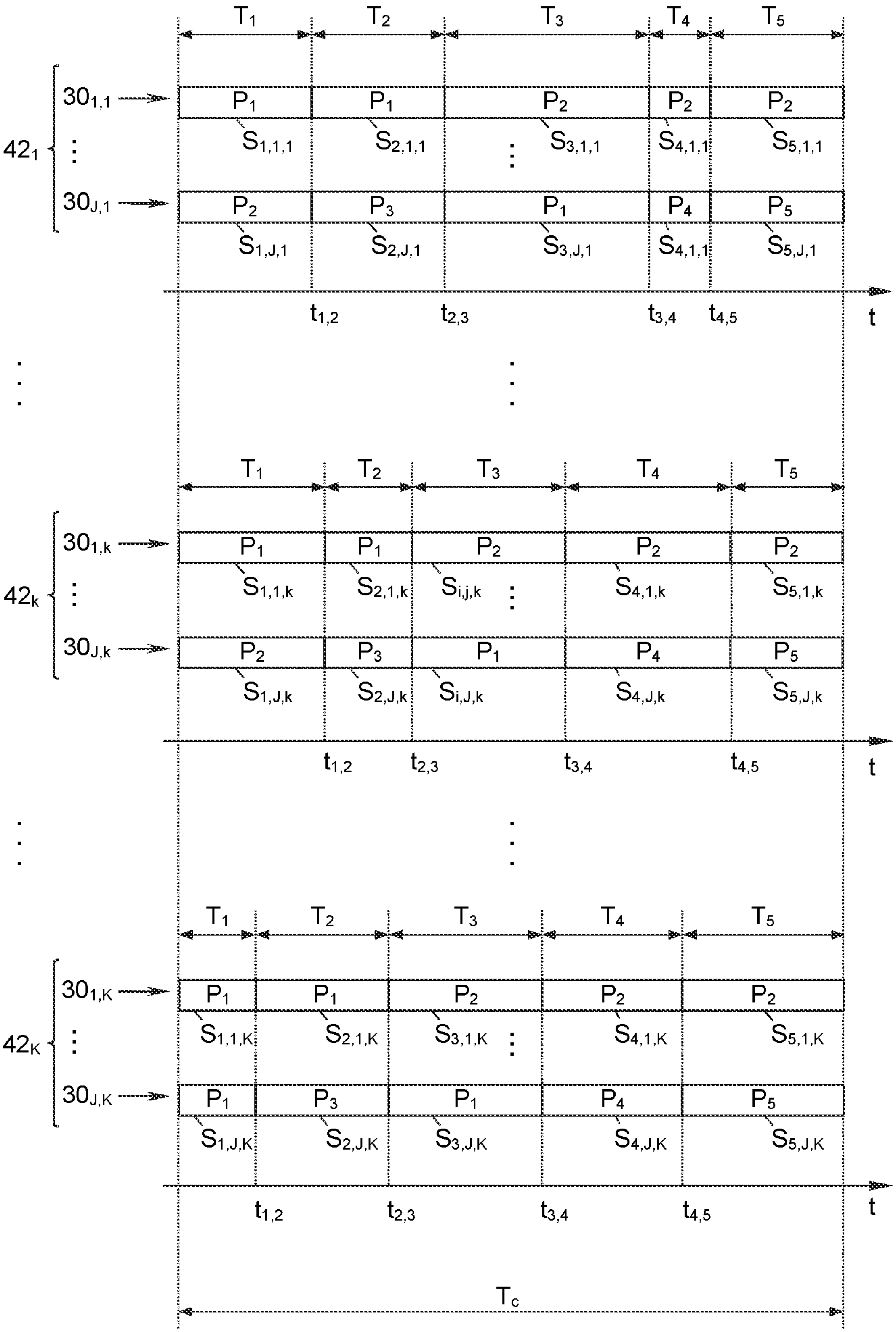

The disclosed subject matter shall now be described in more detail by means of exemplary embodiments thereof under reference to the enclosed drawings, in which show:

FIG. 1 an intersection of lanes in a transportation network, a controller switching traffic lights, and a central server updating the controller in a schematic bird view;

FIG. 2 a set of phase sequences stored in a memory of the controller of FIG. 1 and used by the controller for traffic light switching in a diagram of phase sequences over time;

FIG. 3 a method according to the disclosed subject matter for updating the set of phase sequences of FIG. 2 stored in the memory of the controller of FIG. 1 in a flow diagram; and FIG. 4 candidate sets of phase sequences generated in the method of FIG. 3 in a diagram of phase sequences over time.

DETAILED DESCRIPTION

FIG. 1 shows a transportation network 1 and an intersection 2 of lanes 3-17 in the transportation network 1. The transportation network 1 can comprise any type of lanes such as car lanes (lanes 4 and 5), bus lanes (lane 3), tramways (lane 15), pedestrian crossings (lanes 16 and 17), bike lanes (not shown), railways (not shown), mixed lanes (not shown), etc. The intersection 2 may be formed by any crossing, removal (e.g., road narrowing) or opening (e.g., road expansion) of lanes.

The traffic at the intersection 2 is regulated via event-responsive traffic lights 18-28 which are controlled by a local controller 29 via a wired or wireless control path A. The controller 29 switches the traffic lights 18-28 in cycles of a cycle duration $T_c$ and, in each cycle, according to a sequence $\mathbf{30}_j$ of phases $P_n$ (FIG. 2). Each phase $P_1$, $P_2$, . . . , generally $P_n$, corresponds to a specific switching state of the traffic lights 18-28 and, thus, allows traffic flow on none, one or more of the lanes 3-17, e.g., a first phase $P_1$ corresponds to a switching state of the traffic lights 18-20 being green and the remaining traffic lights 21-28 being red, which allows for traffic flow on the lanes 3-5 and 17 as indicated by the solid arrows in FIG. 1.

For event-responsive control of the traffic lights 18-28 according to a traffic demand at the intersection 2, the controller 29 detects lane-related events indicating a traffic demand and controls the traffic lights 18-28 in dependence thereon. To detect lane-related events such as the presence or arrival of pedestrians 31, a tramway, a bus, an emergency vehicle etc., the controller 29 is connected or connectable to event detectors like pedestrian push-buttons 32, a tramway detector 33, a bus detector 34, a wireless communication device carried by an emergency vehicle (not shown) etc., via a wired or wireless detection path B.

To control the traffic lights 18-28 event-responsively, the controller 29 stores, in a memory 35, a set 36 of phase sequences $\mathbf{30}_1$, $\mathbf{30}_2$, . . . , $\mathbf{30}_J$, generally $\mathbf{30}_j$ (j=1 . . . J), (FIG. 2) and changes between the phase sequences $\mathbf{30}_j$ upon detection of a lane-related event.

As can be seen in FIG. 2, each phase sequence $\mathbf{30}_j$ of the set 36 has ordered time slots $S_{1,j}$, $S_{2,j}$, . . . , $S_{I,j}$, generally $S_{i,j}$ (i=1 . . . I). Each time slot $S_{i,j}$ is occupied by a respective one of the phases $P_n$. Time slots $S_{i,j}$ of the same order i have the same duration $T_i$. Hence, all first time slots $S_{1,1}$, $S_{1,2}$, . . . , $S_{1,J}$ have the same duration $T_1$, all second time slots $S_{2,1}$, $S_{2,2}$, . . . , $S_{2,J}$ have the same duration $T_2$, and so on, to facilitate the change between phase sequences $\mathbf{30}_j$ at the transitions ("anchor points") between one time slot $S_{i,j}$ and the next time slot $S_{1+i,j}$.

For instance, without any detection of a lane-related event, the controller 29 may switch the traffic lights 18-28 according to the first phase sequence $\mathbf{30}_1$ of FIG. 2 only between two phases $P_1$ and $P_2$ and thereby first allow traffic on the lanes 4, 5 and 17 in the first phase $P_1$ (solid arrows in FIG. 1) for two time slots $S_{1,1}$ and $S_{1,2}$ of durations $T_1$ and $T_2$, and then allow car traffic on the lanes 6, 7 and 12 in the second phase $P_2$ (dotted arrows in FIG. 1) for three time slots $S_{1,3}$, $S_{1,4}$ and $S_{1,5}$ of durations $T_3$, $T_4$ and $T_5$.

However, upon detection of a lane-related event, e.g., a detection that pedestrians 31 have activated the push-button 32 within the first time slot $S_{1,1}$, the controller 29 changes from the first phase sequence $\mathbf{30}_1$ to another phase sequence $\mathbf{30}_j$ (see block arrow 37 in FIG. 2) that comprises a third phase $P_3$ in which the traffic lights 24, 25 are green, to allow for a pedestrian crossing (dashed arrow in FIG. 1) within the cycle duration $T_c$. Depending on activations of further detectors 33, 34 the controller 29 may then, e.g., change again from the j-th sequence $\mathbf{30}_j$ to another sequence $\mathbf{30}_J$ (see block arrow 38 in FIG. 2) which, e.g., comprises a fourth phase $P_4$ allowing for tramway traffic and a fifth phase $P_5$ allowing for bus traffic, etc.

Thus, in general, the controller 29 monitors the detected lane-related events within each time slot duration $T_i$ or, e.g., in a "look back" time window W preceding the end of the time slot duration $T_i$, determines that phase sequence $\mathbf{30}_j$ from the set 36 which fits the detected lane-related events, and changes thereto at the end of the time slot duration $T_i$, i.e. at a phase transition time ("anchor point") $t_{i,i+1}$ (in FIG. 2: $t_{1,2}$, $t_{2,3}$, $t_{3,4}$, $t_{4,5}$).

However, the set 36 of phase sequences $\mathbf{30}_j$ stored in the controller 29 might not suit well the current traffic situation in the transportation network 1, e.g., green phases for passengers and/or cars might be too long or too short, too rare or too frequent within each cycle. To overcome this problem, a central server 39 is connected to the controller 29 and configured to update the set 36 used by controller 29 on the basis of the current or near-future traffic flow on the lanes 3-17. A method 40 for updating the controller 29, which is carried out by a system 41 formed by the controller 29 and the central server 39, shall now be described with reference to FIGS. 3 and 4.

The central server 39, carries out a first part $\mathbf{40}_S$ of the method 40 comprising steps a)-d) and the controller 29 carries out a second part $\mathbf{40}_C$ of the method 40.

In the first step a) of the method 40 the server 39 generates candidate sets $\mathbf{42}_1$, $\mathbf{42}_2$, . . . $\mathbf{42}_K$, generally $\mathbf{42}_k$, of phase sequences $\mathbf{30}_{j,k}$ (the additional index k denoting the candidate set dependency). One of candidate sets $\mathbf{42}_k$ will later be used as the set 36 by the controller 29.

As illustrated in FIG. 4, each candidate set $\mathbf{42}_k$ is generated with its own time slot durations $T_i$ and phase transition times $t_{i,i+1}$ within the cycle duration $T_c$: In each candidate set $\mathbf{42}_k$ all phase sequences $\mathbf{30}_{k,j}$ have a same number (here: five; alternatively more or less) of ordered time slots $S_{i,j,k}$ (the additional index k denoting the candidate set dependency), and time slots $S_{i,j,k}$ of the same order, i.e. with the same index i, have the same duration $T_i$ as described above. Different candidate sets $\mathbf{42}_k$, however, differ at least in the duration $T_i$ of a time slot $S_{i,j,k}$ of a specific order and, hence, in at least one phase transition time $t_{i,i+1}$ within the cycle duration $T_c$. Optionally, different candidate sets $\mathbf{42}_k$ may further differ, e.g., in the number of time slots $S_{i,j,k}$ or in the phases $P_n$ occupying the time slots $S_{i,j,k}$.

Each time slot $S_{i,j,k}$ is occupied by a respective phase $P_n$, and the selection of phases $P_n$ occupying all time slots of a phase sequence $\mathbf{30}_{j,k}$ can either be carried out by combinatorics, e.g., by choosing all possible combinations of phases $P_n$ for the time slots $S_{i,j,k}$, or empirically by selecting only those sequences of phases $\mathbf{30}_{j,k}$ that allow for a smooth traffic without a blockage of the intersection 2. To reduce the number of candidate sets $\mathbf{42}_k$ and to employ only suitable phase sequences $\mathbf{30}_{j,k}$ the candidate sets $\mathbf{42}_k$ may optionally be generated such that a specific phase $P_n$ may only occupy a time slot $S_{i,j,k}$ of a minimum duration $T_i$. For instance, the phase $P_3$ allowing for pedestrian crossing may require a minimal allowing ("green") time for an actual pedestrian crossing and, thus, only occupy time slots $S_{i,j,k}$ whose duration $T_i$ is larger than that minimal green time.

In the second step b) of the method 40 the server 39 determines the traffic flows on the lanes 3-17. To this end, the server 39 is connected to one or more sensors 43-47 for measuring the traffic flows on the lanes 3-17, receives the measured traffic flows therefrom via wired or wireless paths C, and processes the measured traffic flows. Each of the sensors 43-47 may be any traffic flow sensor, such as an inductive loop, a radar, an active or passive infrared sensor, a video sensor, a sensor communicating with mobile phones or vehicle carried devices indicating their locations, etc.

In a first variant the server 39 may simply take the measured flows as determined flows to determine the current traffic flows on the lanes 3-17.

In a second variant the server 39 may predict the traffic flows on the lanes 3-17. In this case, the server 39 may optionally be further connected to one or more further sensors 48 for measuring the traffic flows on further lanes 49 which do not form the intersection 2. These additional traffic flows may then be taken into account to predict the near-future traffic flow on the lanes 3-17 forming the intersection 2, e.g., utilising a traffic flow model.

In the third step c) of the method 40 the server 39 calculates a cost measure $D_k$ for each candidate set $\mathbf{42}_k$ in dependence on the traffic flows determined in step b) and in dependence on the durations $T_i$ of the time slots $S_{i,j,k}$ in the candidate sets $\mathbf{42}_k$ generated in step a). The cost measure $D_k$ may be any measure quantifying traffic flow such as an average queue length or an average waiting time at the intersection, etc. In an exemplary embodiment the cost measure $D_k$ is an average waiting time and calculated according to $$D_k = C \cdot \sum_{j=1}^{J} \left( \frac{1}{\sum_{i=1}^{I} q_{i,j,k}} \cdot \sum_{i=1}^{I} \frac{q_{i,j,k} \cdot (T_c - T_{g,i,j,k})^2}{\left(1 - \frac{q_{i,j,k}}{s_{i,j,k}}\right)} \right) \quad (1)$$

with $D_k$ the cost measure for the k-th candidate set $\mathbf{42}_k$, $T_{g,i,j,k}$ the duration $T_i$ of the i-th time slot $S_{i,j,k}$ of the j-th phase sequence $\mathbf{30}_{j,k}$ of the k-th candidate set $\mathbf{42}_k$, $q_{i,j,k}$ the cumulative determined traffic flow on all lanes which allow traffic flow in the phase $P_n$ that occupies the i-th time slot $S_{i,j,k}$ of the j-th phase sequence $\mathbf{30}_{j,k}$ of the k-th candidate set $\mathbf{42}_k$, $s_{i,j,k}$ the cumulative given saturation flow on all lanes which allow traffic flow in the phase $P_n$ that occupies the i-th time slot $S_{i,j,k}$ of the j-th phase sequence $\mathbf{30}_{j,k}$ of the k-th candidate set $\mathbf{42}_k$, $T_c$ the cycle duration, I the number of time slots $S_{i,j,k}$ in the j-th phase sequence $\mathbf{30}_{j,k}$ of the k-th candidate set $\mathbf{42}_k$, J the number of phase sequences $\mathbf{30}_{j,k}$ of the k-th candidate set $\mathbf{42}_k$, and C a constant.

The cumulative determined traffic flow $q_{i,j,k}$ is the sum of all traffic flows determined for those lanes that have a respective "traffic-allowing" ("green") traffic light 8-18 in the phase $P_n$ occupying the respective time slot $S_{i,j,k}$. For example, in the phase $P_1$ of FIG. 1 these are the lanes 3-5. The cumulative given saturation flow $s_{i,j,k}$ is a given design parameter of the transportation network 1 which indicates the sum of the maximally possible ("saturation") traffic flows for said lanes that have a respective traffic-allowing (green) traffic light 8-18 in said phase $P_n$ occupying said respective time slot $S_{i,j,k}$ (in the phase $P_1$ of FIG. 1: the lanes 3-5).

In case the candidate sets $\mathbf{42}_k$ do not differ in the phases $P_n$ occupying the time slots $S_{i,j,k}$, equation (1) may be simplified to read $$D_k = C \cdot \sum_{j=1}^{J} \sum_{i=1}^{I} \frac{q_{i,j} \cdot (T_c - T_{g,i,j,k})^2}{\left(1 - \frac{q_{i,j}}{s_{i,j}}\right)} \quad (1')$$

with $q_{i,j}$ the cumulative determined traffic flow on all lanes which allow traffic flow in the phase $P_n$ that occupies the i-th time slot $S_{i,j,k}$ of the j-th phase sequence $\mathbf{30}_{j,k}$, and $s_{i,j}$ the cumulative given saturation flow on all lanes which allow traffic flow in the phase $P_n$ that occupies the i-th time slot $S_{i,j,k}$ of the j-th phase sequence $\mathbf{30}_{j,k}$.

In a subsequent step d) of the method 40, the server 39 identifies that candidate set $\mathbf{42}_{k,opt}$ for which the smallest cost measure $D_k$ has been calculated in step c) and sends that candidate set $\mathbf{42}_{k,opt}$ to the controller 29.

Then, in the second part $\mathbf{40}_C$ of the method 40, the controller 29 receives the candidate set $\mathbf{42}_{k,opt}$ sent in step d), stores that candidate set $\mathbf{42}_{k,opt}$ as the set 36 of phase sequences $\mathbf{30}_j$, and uses the same as mentioned above with reference to FIG. 2. The set 36 has thus been updated by the candidate set $\mathbf{42}_k$ and thereby been adapted to the current or near-future traffic situation at the intersection 2.

For a repeated update of the controller 29, the server 39 carries out steps b) to d) repeatedly in successive intervals as indicated by the loop 50 in FIG. 3. Each of the successive intervals lasts, e.g., at least two cycle durations $T_c$ for a regular update of the set 36 with a low required bandwidth for communications between the server 39 and the sensors 42-46, on the one hand, and the server 39 and the controller 29, on the other hand.

While the method 40 has been described exemplarily for a single intersection 2, it shall be noted that the server 39 can (and typically will) carry out the steps a) to d) for more intersections of the transportation network 1, to generate candidate sets for further intersections, determine traffic flows on further lanes, and update the controller/s which switch the traffic lights at further intersections according to the current or near-future traffic situation in the whole transportation network 1.

The present disclosed subject matter is not restricted to the specific embodiments described in detail herein but encompasses all variants, combinations and modifications thereof that fall within the scope of the appended claims.

What is claimed is:

1. A method of controlling event-responsive traffic lights at an intersection of lanes in a transportation network by means of:

a controller which switches the traffic lights in cycles and, in each cycle, in a sequence of phases, each phase corresponding to a different switching state of the traffic lights and allowing traffic flow on none, one or more of the lanes, wherein the controller has a memory storing a set of phase sequences and is configured to change from one phase sequence of the set to another phase sequence of the set upon detection of a lane-related event, and by means of a central server connected to the controller and to one or more sensors that measure traffic flows on the lanes, the method comprising, in the server:

a) generating candidate sets of phase sequences, wherein in each candidate set all phase sequences have a same number of time slots in the same order, each time slot is occupied by a respective phase and time slots of the same order have the same duration, and wherein each candidate set differs in at least one duration of a time slot of a specific order;

b) determining the traffic flows on the lanes by means of the one or more sensors;

c) calculating a cost measure for each candidate set on the basis of the determined traffic flows on the one hand and the durations on the other hand; and d) sending the candidate set with the lowest cost measure to the controller; in the controller, receiving and storing the sent set in the memory as the set of phase sequences; and repeating steps b)-d) in successive intervals.

2. The method according to claim 1, wherein each of said intervals lasts at least two cycles.

3. The method according to claim 1, wherein the candidate sets are generated such that, in all candidate sets, a specific phase occupies only time slots which each have a minimum duration.

4. The method according to claim 1, wherein the cost measure is an average waiting time.

5. The method according to claim 4, wherein the cost measure is calculated as $$D_k = C \cdot \sum_{j=1}^{J} \left( \frac{1}{\sum_{i=1}^{I} q_{i,j,k}} \cdot \sum_{i=1}^{I} \frac{q_{i,j,k} \cdot (T_c - T_{g,i,j,k})^2}{\left(1 - \frac{q_{i,j,k}}{s_{i,j,k}}\right)} \right)$$

with $D_k$ the cost measure for the k-th candidate set, $T_{g,i,j,k}$ the duration of the i-th time slot of the j-th phase sequence of the k-th candidate set, $q_{i,j,k}$ the cumulative determined traffic flow on all lanes which allow traffic flow in the phase that occupies the i-th time slot of the j-th phase sequence of the k-th candidate set, $s_{i,j,k}$ the cumulative given saturation flow on all lanes which allow traffic flow in the phase that occupies the i-th time slot of the j-th phase sequence of the k-th candidate set, $T_c$ the cycle duration, I the number of time slots in the j-th phase sequence of the k-th candidate set, J the number of phase sequences of the k-th candidate set, and C a constant.

6. The method according to claim 1, wherein the cost measure is an average queue length.

7. The method according to claim 1, wherein the server is connected to a further sensor for measuring a traffic flow on a further lane in the transportation network, and wherein, in said step b) of determining the traffic flows, the traffic flow on the further lane is taken into account.

8. A central server for controlling event-responsive traffic lights at an intersection of lanes in a transportation network, the server being connectable to a controller that switches the traffic lights in cycles and, in each cycle, in a sequence of phases, each phase corresponding to a different switching state of the traffic lights and allowing traffic flow on none, one or more of the lanes, and being connectable to one or more sensors that measure traffic flows on the lanes, wherein the server is configured to:

a) generate candidate sets of phase sequences, wherein in each candidate set all phase sequences have a same number of time slots in the same order, each time slot is occupied by a respective phase and time slots of the same order have the same duration, and wherein each candidate set differs in at least one duration of a time slot of a specific order;

b) determine the traffic flows on the lanes by means of the one or more sensors;

c) calculate a cost measure for each candidate set on the basis of the determined traffic flows on the one hand and the durations on the other hand; and d) send the candidate set with the lowest cost measure to the controller; and to repeat the steps b)-d) in successive intervals.

9. The server according to claim 8, wherein each of said intervals lasts at least two cycles.

10. The server according to claim 8, wherein the server is configured to generate the candidate sets such that, in all candidate sets, a specific phase occupies only time slots which each have a minimum duration.

11. The server according to claim 8, wherein the cost measure is an average waiting time.

12. The server according to claim 11, wherein the server is configured to calculate the cost measure as with $$D_k = C \cdot \sum_{j=1}^{J} \left( \frac{1}{\sum_{i=1}^{I} q_{i,j,k}} \cdot \sum_{i=1}^{I} \frac{q_{i,j,k} \cdot (T_c - T_{g,i,j,k})^2}{\left(1 - \frac{q_{i,j,k}}{s_{i,j,k}}\right)} \right)$$

$D_k$ the cost measure for the k-th candidate set, $T_{g,i,j,k}$ the duration of the i-th time slot of the j-th phase sequence of the k-th candidate set, $q_{i,j,k}$ the cumulative determined traffic flow on all lanes which allow traffic flow in the phase that occupies the i-th time slot of the j-th phase sequence of the k-th candidate set, $s_{i,j,k}$ the cumulative given saturation flow on all lanes which allow traffic flow in the phase that occupies the i-th time slot of the j-th phase sequence of the k-th candidate set, $T_c$ the cycle duration, I the number of time slots in the j-th phase sequence of the k-th candidate set, J the number of phase sequences of the k-th candidate set, and C a constant.

13. The server according to claim 8, wherein the cost measure is an average queue length.

14. The server according to claim 8, wherein the server is connectable to a further sensor for measuring a traffic flow on a further lane in the transportation network, and wherein the server is configured to take into account the traffic flow on the further lane when determining the traffic flows.

* * * * *